United States Patent
Kai-Cheng et al.

(10) Patent No.: US 7,155,976 B2
(45) Date of Patent: Jan. 2, 2007

(54) ROTATION SENSING APPARATUS AND METHOD FOR MANUFACTURING THE SAME

(75) Inventors: Chang Kai-Cheng, Taipei (TW); Liang Pei-Fang, Beigang Town (TW); Hsu Ming-Hsiu, Nantou (TW); Chen Yi-Ru, Shuilin Shiang (TW); Chen Ya-Ping, Qiaotou Shiang (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/028,524

(22) Filed: Jan. 5, 2005

(65) Prior Publication Data

US 2006/0156812 A1   Jul. 20, 2006

(51) Int. Cl.
  *G01C 19/00* (2006.01)
  *G01P 9/00* (2006.01)
(52) U.S. Cl. ............................. 73/504.04; 73/504.12; 73/504.14
(58) Field of Classification Search ............. 73/504.02, 73/504.04, 504.12, 504.13, 504.14, 514.32, 73/514.29, 510
See application file for complete search history.

(56) References Cited

U.S. PATENT DOCUMENTS

| | | | |
|---|---|---|---|
| 6,418,789 B1 * | 7/2002 | Ishitoko et al. .......... | 73/504.12 |
| 6,509,670 B1 * | 1/2003 | Jeong et al. ................ | 310/309 |
| 6,766,689 B1 * | 7/2004 | Spinola Durante et al. ....................... | 73/504.04 |
| 6,823,733 B1 * | 11/2004 | Ichinose .................. | 73/504.02 |
| 6,837,107 B1 * | 1/2005 | Geen ....................... | 73/504.04 |
| 6,877,374 B1 * | 4/2005 | Geen ....................... | 73/504.14 |

* cited by examiner

*Primary Examiner*—Hellen Kwok
(74) *Attorney, Agent, or Firm*—Troxell Law Office, PLLC

(57) ABSTRACT

The invention provides a rotation sensing apparatus and method for manufacturing the same, in which the rotation sensing apparatus comprises at least a pair of vibration parts and a sensing electrode. The pair of vibration parts is disposed on a substrate symmetrically and each vibration part comprises an electrostatic vibrating body, a fixed support and an elastic body. The electrostatic vibrating body is away from the substrate with an appropriate distance. The fixed support connects with the electrostatic vibrating body and the substrate. The elastic body connects the fixed support with some rods thereof and connects with the electrostatic vibrating body with some other rods thereof. The sensing electrode is disposed on the substrate and under the at least pair of vibration parts. The pair of vibration parts can vibrate horizontally by electrostatic force and will sway vertically to the substrate by Coriolis force when a rotation occurs. The rotation can be measured by detecting the change of capacitance between the electrostatic vibrating body and the sensing electrode.

13 Claims, 8 Drawing Sheets

ROTATION SENSING APPARATUS AND METHOD FOR MANUFACTURING THE SAME

FIELD OF THE INVENTION

The present invention relates to a rotation sensing apparatus and method for manufacturing the same, more particularly to a rotation sensing apparatus for measuring rotations of multiple axes and method for manufacturing the same, in which the vibrating structure body is formed in the manufacturing process and has a stable center of mass.

BACKGROUND OF THE INVENTION

Gyroscope is an inertial sensing element and mainly measures angular velocity of a rotation by law of inertia. Traditional gyroscopes work by utilizing conservation law of angular momentum and are mainly applied for navigation in the fields of military, aeronautics and sailing. However, traditional gyroscopes have problems of with complicated structure and been fast wear and tear such that traditional gyroscopes have short usage of life, expensive price and heavy weight.

By developments of consumer industry, the demands of gyroscopes with light weight, cheap price and long usage of life increase in the fields of inertial navigation, automobile, robot, medical engineering, consumer electronics and electronic entertainments. Due to recent evolvement of semiconductor technology, Microelectromechanical (MEMS) process technology combining semiconductor process, mechanical and electronic technology makes more and more progress. Therefore, a micro gyroscope sensor with light weight and cheap price can be manufactured by MEMS technology.

In gyroscope sensors, vibrating sensor for sensing rotation is main stream and is disclosed in quite many prior arts. For example, the technique disclosed in U.S. Pat. No. 4,381,672 senses rotation by using a single cantilever beam structure. However, the center of mass of the cantilever structure will change continuously due to vibration of the cantilever beam, so that noise will occurs to disturb the measured results. Therefore, U.S. Pat. Nos. 5,445,025 and 6,201,341 utilize symmetrical vibrating structures for overcoming the drawback of changing center of mass. However, the structures disclosed in the above-mentioned two patents can not be minified by MEMS process technology even if they can solve the problem of changing center of mass due to asymmetric structure.

In view of the above-mentioned problems, an improved rotation sensing apparatus and method for manufacturing the same is required to solve the defects of the prior arts.

SUMMARY OF THE INVENTION

The primary objective of the present invention is to provide a rotation sensing apparatus and method for manufacturing the same, in which measuring rotations of multiple axes can be achieved by utilizing symmetrical structure combination.

The secondary objective of the present invention is to provide a rotation sensing apparatus and method for manufacturing the same such that the apparatus can be manufactured by MEMS process technology. The invention utilizes symmetrical structure combination to generate effect of resonance for reducing power consumption of elements and reducing electrostatic driving voltage.

Another objective of the present invention is to provide a rotation sensing apparatus and method for manufacturing the same, in which a structural design is utilized such that center of mass of the apparatus will not change when the apparatus is driven and thus noise disturbance is reduced.

To achieve the foregoing objectives, the present invention provides a rotation sensing apparatus and method for manufacturing the same, in which the rotation sensing apparatus comprises at least a pair of vibration parts and a sensing electrode. The pair of vibration parts is disposed on a substrate symmetrically and each vibration part comprises an electrostatic vibrating body, a fixed support and an elastic body. The electrostatic vibrating body is away from the substrate with an appropriate distance. The fixed support connects with the electrostatic vibrating body and the substrate. The elastic body connects the fixed support with some rods thereof and connects with the electrostatic vibrating body with some other rods thereof. The sensing electrode is disposed on the substrate and under the pair of vibration parts. The pair of vibration parts can vibrate horizontally by electrostatic force generated between the vibration parts and will sway vertically to the substrate by Coriolis force when a rotation occurs. The rotation can be measured by detecting the change of capacitance between the electrostatic vibrating body and the sensing electrode.

To achieve the above-mentioned objectives, the present invention further provides a method for manufacturing a rotation sensing apparatus, comprising the following steps: (a) forming a first conducting layer on a substrate; (b) forming an insulating layer on the first conducting layer; (c) removing a part of the insulating layer on the first conducting layer to form a trough; (d) forming a sacrificial layer on the insulating layer and filling the trough; (e) removing the sacrificial layer filled in the trough to expose the first conducting layer and form a contact hole; (f) forming a second conducting layer on the sacrificial layer and filling the contact hole; (g) etching a part of the second conducting layer to form at least a pair of electrostatic vibrating structures; and (h) removing the sacrificial layer.

To achieve the above-mentioned objectives, the present invention still provides a method for manufacturing a rotation sensing apparatus, comprising the following steps: (a) forming a first conducting layer on a substrate; (b) forming an insulating layer on the first conducting layer; (c) removing a part of the insulating layer on the first conducting layer to form a trough; (d) forming a sacrificial layer on the insulating layer and filling the trough; (e) removing the sacrificial layer filled in the trough to expose the first conducting layer and form a contact hole; (f) forming a second conducting layer on the sacrificial layer and filling the contact hole; (g) etching a part of the second conducting layer to form at least a pair of electrostatic vibrating structures; (h) forming at least an inertial array layer on the at least a pair of electrostatic vibrating structures; and (i) removing the sacrificial layer.

To make the examiner easier to understand the objectives, structure, innovative features, and function of the invention, preferred embodiments together with accompanying drawings are illustrated for the detailed description of the invention.

DESCRIPTION OF THE PREFERRED EMBODIMENT

Figure 1:
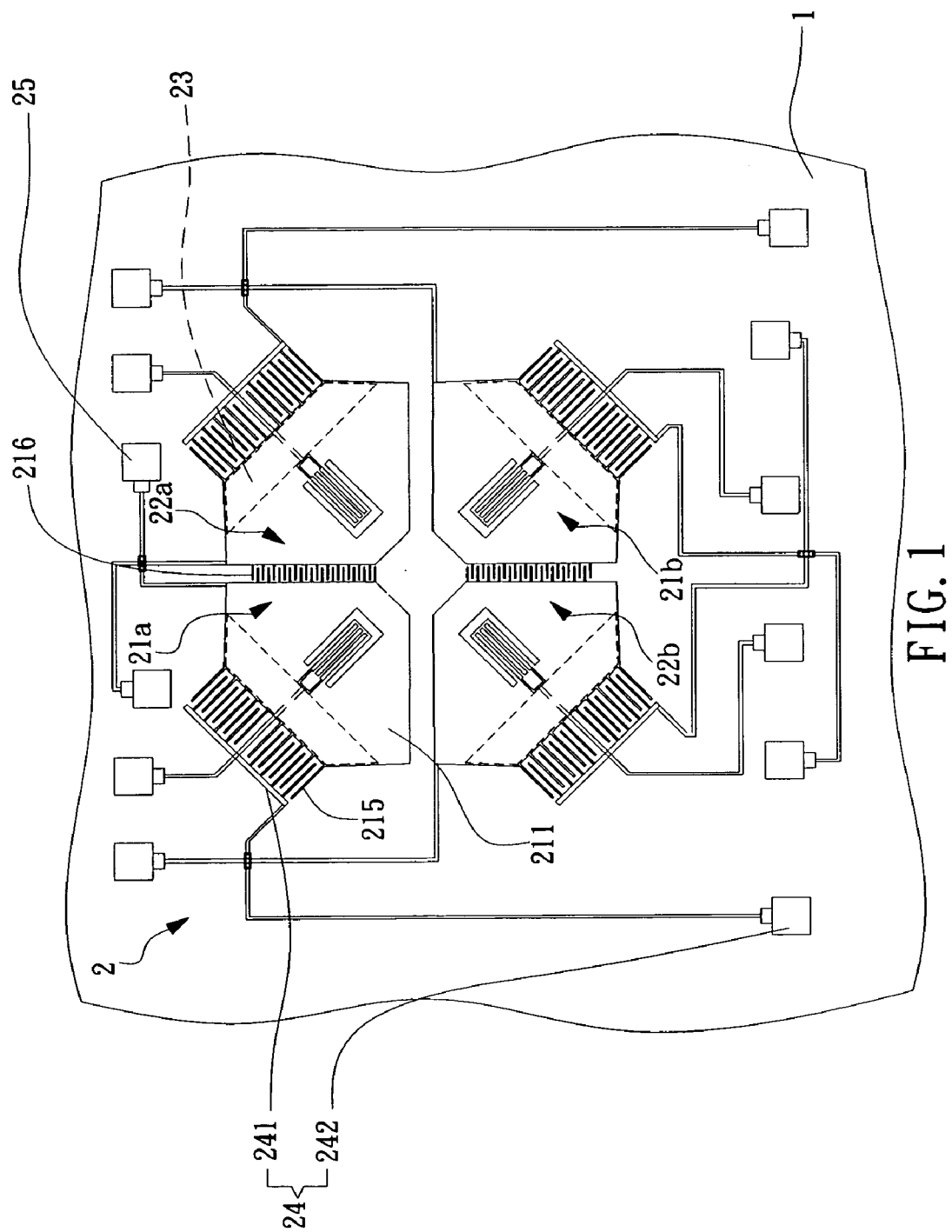
FIG. 1 is a diagram of an embodiment of a rotation sensing apparatus of the present invention.

FIG. 1 is a diagram of a preferred embodiment of a rotation sensing apparatus of the present invention. The rotation sensing apparatus 2 comprises a first pair of vibration parts 21a and 21b, a second pair of vibration parts 22a and 22b, and a sensing electrode 23. The structure of the first pair of vibration parts 21a and 21b is the same with the one of the second pair of vibration parts 22a and 22b. The first pair of vibration parts 21a and 21b and the second pair of vibration parts 22a and 22b are disposed on a substrate 1 symmetrically and are away from the substrate 1 with an appropriate distance (not shown). The first pair of vibration parts 21a and 21b is orthogonal to the second pair of vibration parts 22a and 22b.

Figure 2:
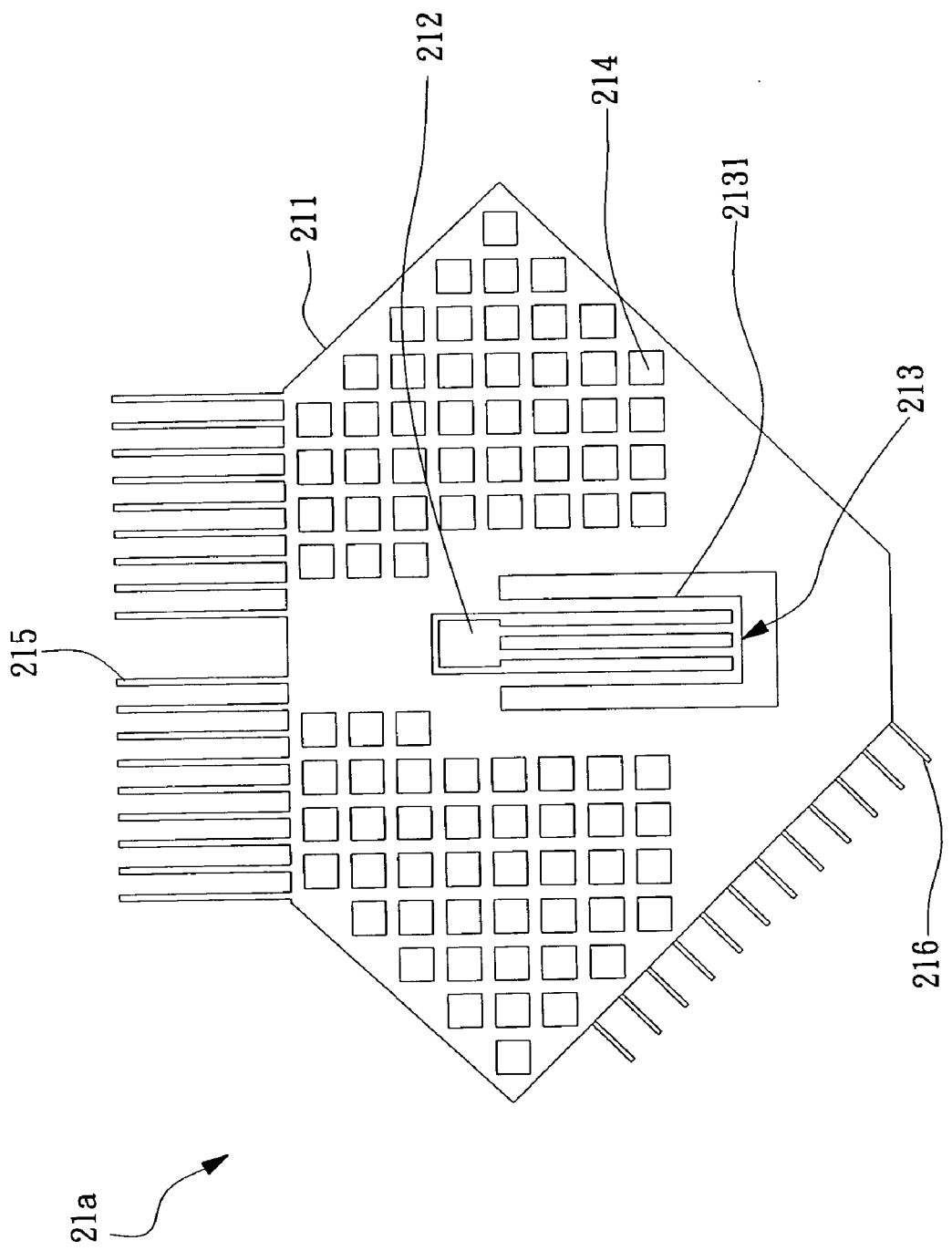
FIG. 2 is a diagram of a vibration part of an embodiment of a rotation sensing apparatus of the present invention.

FIG. 2 is a diagram of a vibration part of the preferred embodiment of a rotation sensing apparatus of the present invention. The vibration part 21a comprises a electrostatic vibrating body 211, a fixed support 212, an elastic body 213, a plurality of mass bodies 214, and a feedback comb drive 215. The electrostatic vibrating body 211 is a conductor and electrically connects to a driving circuit 25 (referring to FIG. 1). The fixed support 212 is disposed at the center of mass of the electrostatic vibrating body 211 and connects to the substrate 1. The elastic body 213 connects to the fixed support 212 with some rods thereof and connects to the electrostatic vibrating body 211 with some other rods thereof. The elastic body 213 comprises multiple long rods 2131 thus the electrostatic vibrating body 211 can be controlled to vibrate in specific direction by the high aspect ratio of the long rods 2131. The electrostatic vibrating body 211 has a symmetrical center line through the connecting position of the elastic body 213 and the fixed support 212 and along the long rods 2131.

The plurality of mass bodies 214 are separated with each other and disposed on the electrostatic vibrating body 211. The mass body is made of a conductor material or a semiconductor material. In the preferred embodiment of the present invention, gold (Au) is used as the material of the plurality of mass bodies 214. The feedback comb drive 215 is disposed on one side of the electrostatic vibrating body 211.

Referring back to FIG. 1, for enhancing electrostatic force to increase vibration effects, at least one side adjacent to the first pair of vibration parts 21a and 21b and the second pair of vibration parts 22a and 22b has a mutually interlaced comb electrode structure 216. The sensing electrode 23 is disposed on the substrate 1 and under the first pair of vibration parts 21a and 21b and the second pair of vibration parts 22a and 22b. A feedback electrode part 24 comprises a comb electrode structure 241 and a controlling circuit 242, wherein the comb electrode structure 241 is mutually interlaced with the feedback comb drive 215 and the controlling circuit 242 is used for a closed loop control when driving the electrostatic vibrating body 211 to vibrate.

Figure 3A:
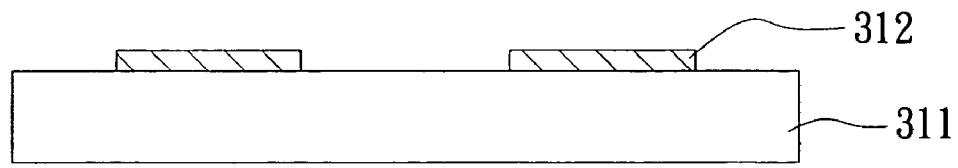
FIG. 3A–3G are flow charts of an embodiment of a method for manufacturing a rotation sensing apparatus of the present invention.
Figure 3B:
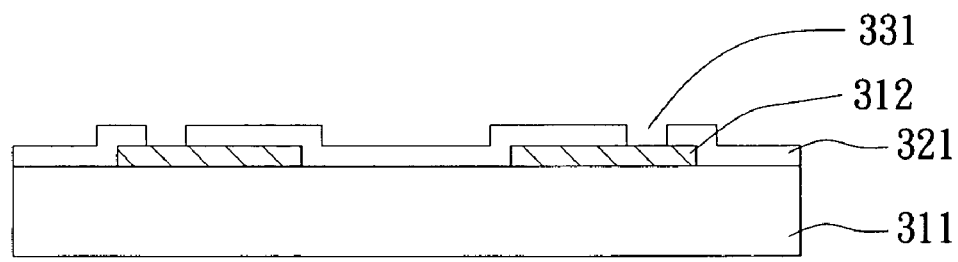
Figure 3C:
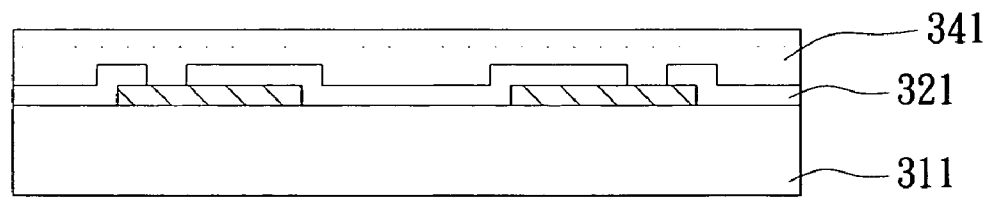
Figure 3D:
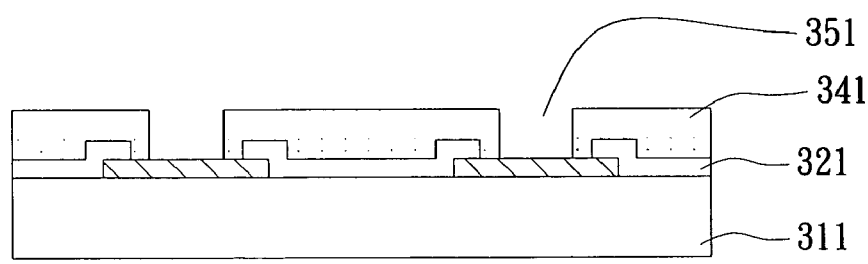
Figure 3E:
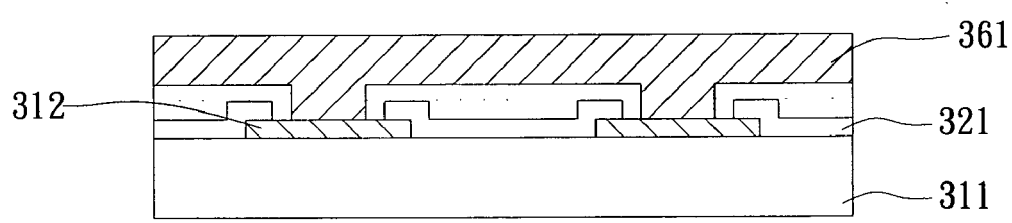
Figure 3F:
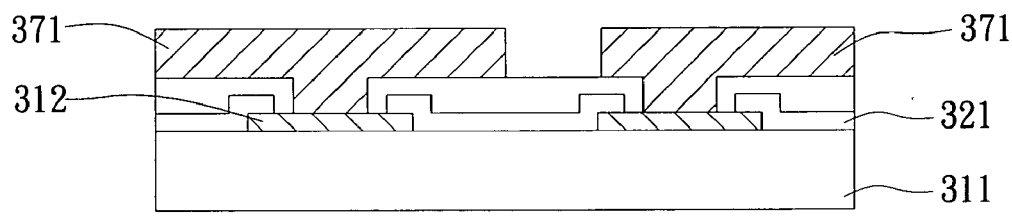
Figure 3G:
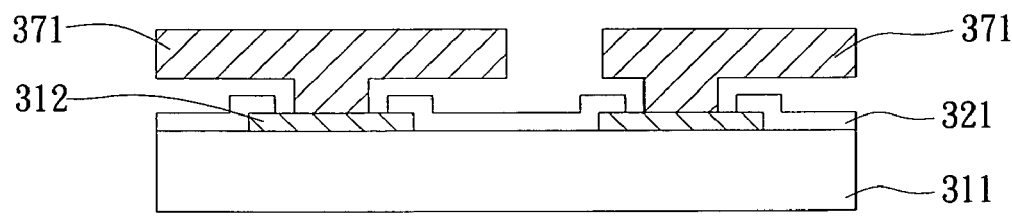

FIG. 3A to FIG. 3G are flow charts of a preferred embodiment of a method for manufacturing a rotation sensing apparatus of the present invention. The method comprises the following steps: forming a first conducting layer 312 on a substrate 311 (FIG. 3A); forming an insulating layer 321 on the first conducting layer 312 and removing a part of the insulating layer 321 on the first conducting layer 312 to form a trough 331 (FIG. 3B); forming a sacrificial layer 341 on the insulating layer 321 and filling the trough 331 (FIG. 3C); removing the sacrificial layer 341 filled in the trough 331 to expose a part of the first conducting layer 312 and form a contact hole 351 (FIG. 3D); forming a second conducting layer 361 on the sacrificial layer 341 and filling the contact hole 351 (FIG. 3E); etching a part of the second conducting layer 361 to form at least a pair of electrostatic vibrating structures 371 (FIG. 3F); and removing the sacrificial layer 314 (FIG. 3G). In the embodiment, $SiO_2$ is used as the material of the sacrificial layer 314 and $Si_3N_4$ is used as the material of the insulating layer 321.

Figure 4A:
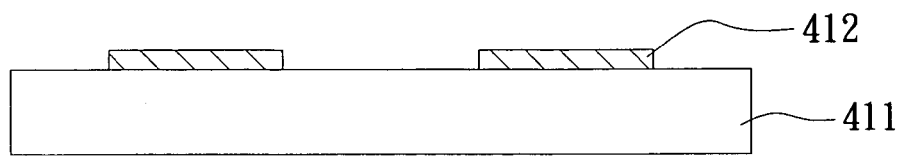
FIG. 4A–4H are flow charts of another embodiment of a method for manufacturing a rotation sensing apparatus of the present invention.
Figure 4B:
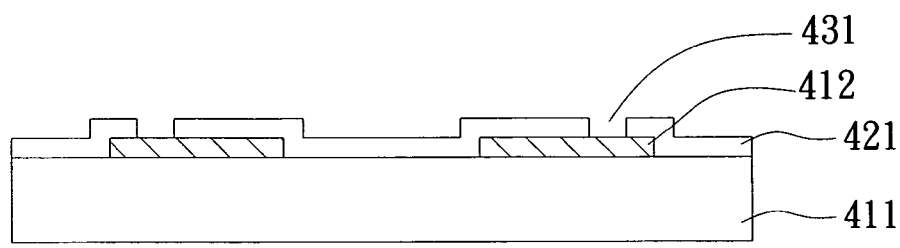
Figure 4C:
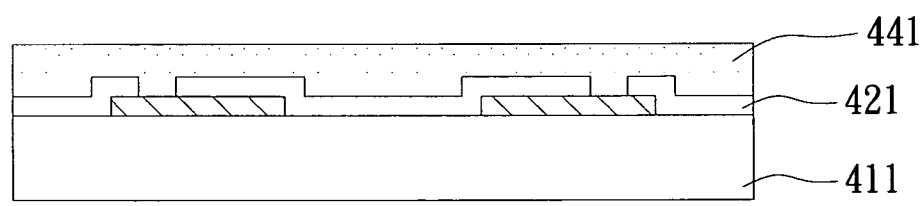
Figure 4D:
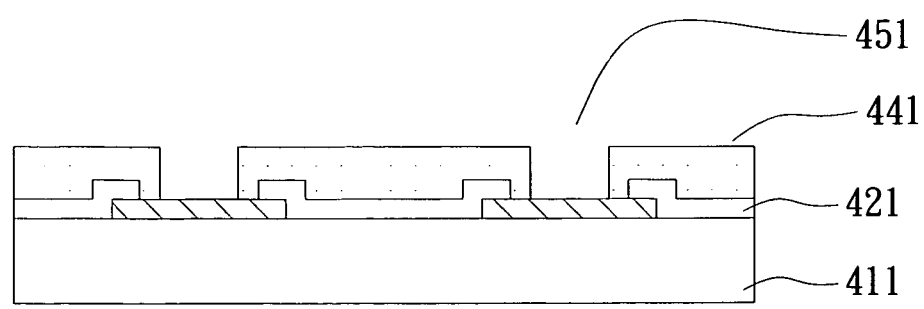
Figure 4E:
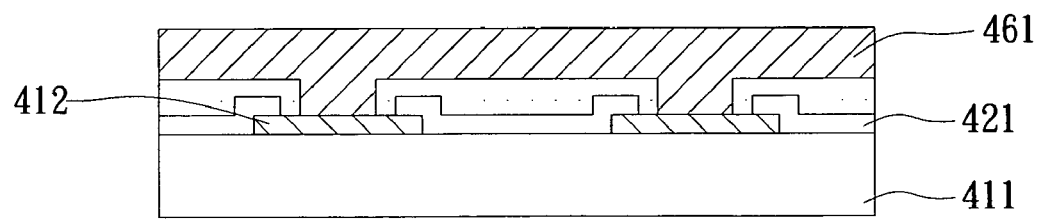
Figure 4F:
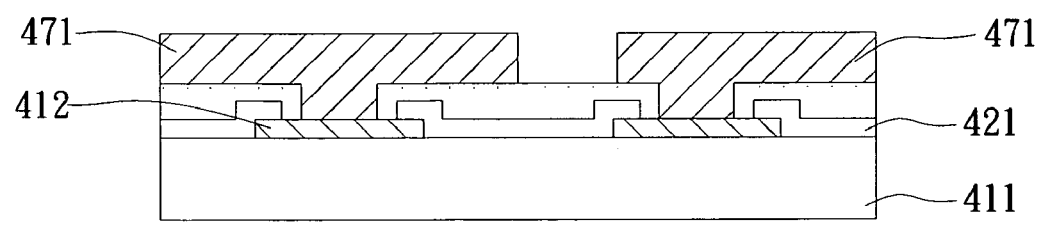
Figure 4G:
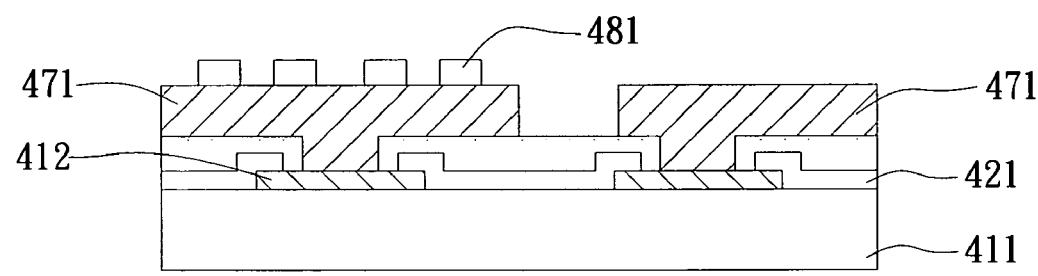
Figure 4H:
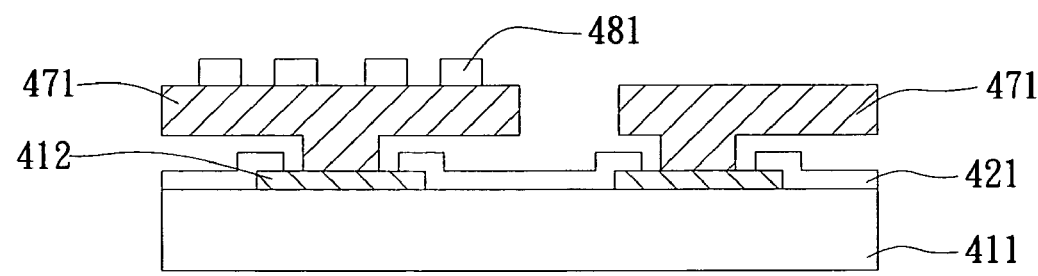

For increasing vibration effects, at least a material layer can be added on the second conducting layer to increase mass of the second conducting layer. FIG. 4A to FIG. 4H are flow charts of another preferred embodiment of a method for manufacturing a rotation sensing apparatus of the present invention. The method comprises the following steps: forming a first conducting layer 412 on a substrate 411 (FIG. 4A); forming an insulating layer 421 on the first conducting layer 412 and removing a part of the insulating layer 421 on the first conducting layer 412 to form a trough 431 (FIG. 4B); forming a sacrificial layer 441 on the insulating layer 421 and filling the trough 431 (FIG. 4C); removing the sacrificial layer 441 filled in the trough 431 to expose a part of the first conducting layer 412 and form a contact hole 451 (FIG. 4D); forming a second conducting layer 461 on the sacrificial layer 441 and filling the contact hole 451 (FIG. 4E); etching a part of the second conducting layer 461 to form at least a pair of electrostatic vibrating structures 471 (FIG. 4F); forming at least an inertial array layer 481 on the at least a pair of electrostatic vibrating structures 471 (FIG. 4G); and removing the sacrificial layer 414 (FIG. 4H). In the embodiment, $SiO_2$ is used as the material of the sacrificial layer 414 and $Si_3N_4$ is used as the material of the insulating layer 421. The inertial array layer 481 is made of a conductor material or a semiconductor material and, and in the embodiment, a conductor material of gold (Au) is selected.

Figure 5A:
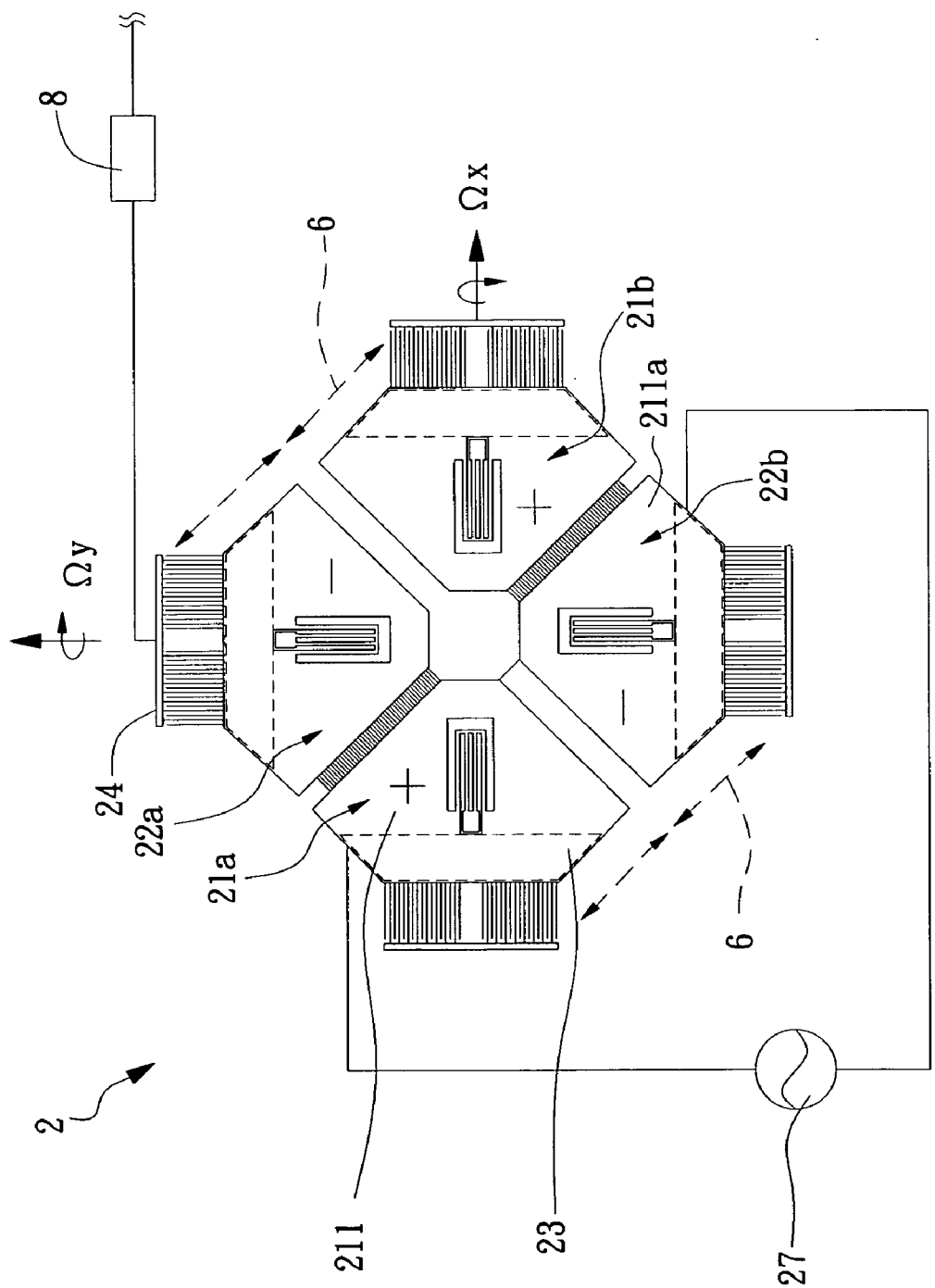
FIG. 5A is a diagram showing vibration of a rotation sensing apparatus of the present invention.

After understanding the structure and manufacturing method of the present invention, the detailed operation of the invention will be described. Referring to FIG. 5A, which is a diagram showing vibration of a rotation sensing apparatus of the present invention. The rotation sensing apparatus 2 can measure rotations of two axes, which are rotations $\Omega x$ and $\Omega y$ of X axis and Y axis in the embodiment. When the first pair of vibration parts 21a and 21b have positive charges and the second pair of vibration parts 22a and 22b have negative charges, there will be an electrostatic attractive force generated between the electrostatic vibrating body 211 of the first pair of vibration parts 21a and 21b and the electrostatic vibrating body 211' of the second pair of vibration parts 22a and 22b. On the other hand, when the first pair of vibration parts 21a and 21b have positive charges and the second pair of vibration parts 22a and 22b have positive charges, there will be an electrostatic repulsive force generated between the electrostatic vibrating body 211 of the first pair of vibration parts 21a and 21b and the electrostatic vibrating body 211' of the second pair of vibration parts 22a and 22b. By the above-mentioned principle, the two pairs of vibration parts can be provided with a periodic electrical signal by a driving circuit 27 to generate an alternating electric field such that an electrostatic attractive force and an electrostatic repulsive force are alternately generated between the first pair of vibration parts 21a and 21b and the second pair of vibration parts 22a and 22b thus these vibration parts will vibrate in a vibrating direction 6 parallel with the substrate (not shown).

For controlling the frequency of vibration to produce good resonance effects, the invention utilizes a closed loop control circuit 8 to connect with the feedback electrode part 24. The controlling is thus achieved by feeding back the closed loop control circuit 8 with the vibration modes, which are sensed by the feedback electrode part 24, of the electrostatic vibrating bodies 211 and 211'.

Figure 5B:
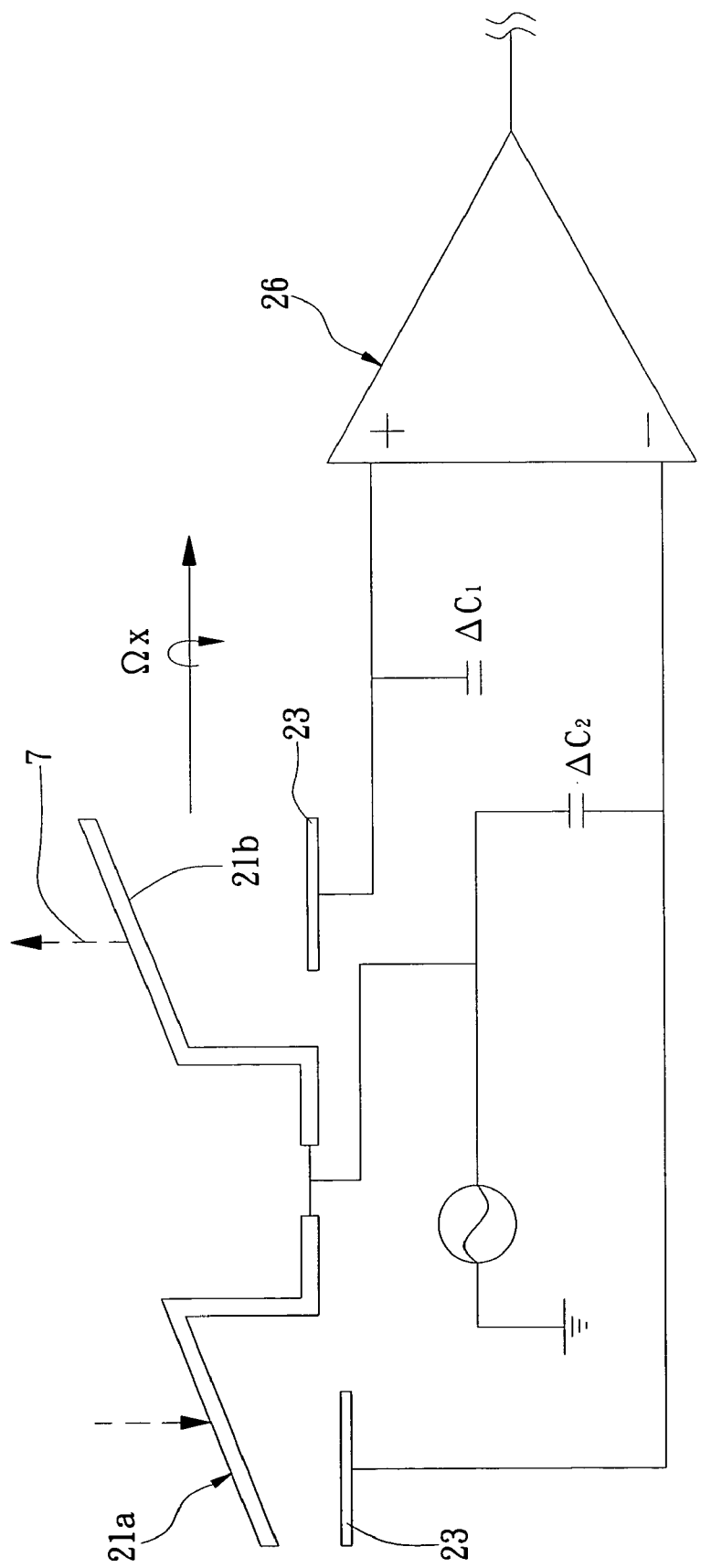
FIG. 5B is a side view showing a Coriolis force effecting on the first pair of vibration parts of a rotation sensing apparatus of the present invention when a rotation of X axis occurs.

Since a velocity V is provided by the vibration due to the electrostatic force between the first pair of vibration parts 21a and 21b and the second pair of vibration parts 22a and 22b, a Coriolis force F will occur when the sensing apparatus is affected by an angular velocity Ω of a rotation to be measured, wherein the Coriolis force $\vec{F}=2M\vec{\Omega}\times\vec{v}$. Referring to FIG. 5B, which is a side view showing a Coriolis force effecting on the first pair of vibration parts of a rotation sensing apparatus of the present invention when a rotation of X axis occurs. In the condition that a vibration is driven by the electrostatic force between the first pair of vibration parts 21a and 21b and the second pair of vibration parts 22a and 22b, the first pair of vibration parts 21a and 21b will sway vertically to the substrate by the Coriolis force when the sensing apparatus is affected by an angular velocity of a rotation of X axis. Because the sway of the first pair of vibration parts 21a and 21b will change the vertical distances of the first pair of vibration parts 21a, 21b to the sensing electrode 23, so that the capacitances between the first pair of vibration parts 21a, 21b and the sensing electrode 23 will be changed. Then the capacitance variations ΔC1 and ΔC2 can be detected by a sensing circuit 26 and the magnitude of the rotation will be reflected through electrical signals.

By the combination of at least one pair of vibration parts of the invention, rotations of multiple axes can be detected. For example, the structure of two pairs of vibration parts as shown in FIG. 1 can detect rotations of a first axis, such as X axis, and a second axis, such as Y axis. In addition, rotations of a first axis, such as X axis, a second axis, such as Y axis, and a third axis, such as Z axis, can be detected by a combination of four pairs of vibration parts.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A rotation sensing apparatus, comprising:
at least a pair of vibration parts disposed on a substrate symmetrically, each vibration part comprises:
an electrostatic vibrating body, which is a conductor and is away from the substrate with an appropriate distance, the electrostatic vibrating body is electrically connected to a driving circuit;
a fixed support, which connects with the electrostatic vibrating body and the substrate;
an elastic body, which connects the fixed support with some rods thereof and connects with the electrostatic vibrating body with some other rods thereof; and
a sensing electrode disposed on the substrate and under the at least pair of vibration parts, wherein the electrostatic vibrating body further comprises a plurality of mass bodies separated with each other and disposed on the electrostatic vibrating body.

2. The rotation sensing apparatus of claim 1, wherein the plurality of mass bodies are made of a conductor material or a semiconductor material.

3. The rotation sensing apparatus of claim 1, wherein each vibration part further comprises a feedback electrode for a closed loop control when driving the electrostatic vibrating bodies to vibrate.

4. The rotation sensing apparatus of claim 3, wherein the feedback electrode is a comb electrode structure mutually interlaced with a feedback comb drive of each electrostatic vibrating body.

5. The rotation sensing apparatus of claim 1, further comprising a driving circuit for providing the electrostatic vibrating bodies with an electric field such that the electrostatic vibrating bodies vibrate due to electrostatic forces.

6. The rotation sensing apparatus of claim 5, wherein the electric field is generated by a periodic electrical signal.

7. The rotation sensing apparatus of claim 1, further comprising a sensing circuit connected to the sensing electrode for detecting capacitance variations between the electrostatic vibrating bodies and the sensing electrode.

8. The rotation sensing apparatus of claim 1, wherein the at least pair of vibration parts comprising a first pair of vibration parts and a second pair of vibration parts and the first pair of vibration parts is orthogonal to the second pair of vibration parts.

9. The rotation sensing apparatus of claim 8, wherein the first pair of vibration parts can detect rotations of a first axis and the second pair of vibration parts can detect rotations of a second axis.

10. The rotation sensing apparatus of claim 8, wherein at least one side adjacent to the first pair of vibration parts and the second pair of vibration parts has a mutually interlaced comb electrode structure.

11. The rotation sensing apparatus of claim 1, wherein the at least pair of vibration parts comprising four pairs of vibration parts for detecting rotations of a first axis, a second axis, and a third axis.

12. The rotation sensing apparatus of claim 1, wherein the elastic body comprises multiple long rods.

13. The rotation sensing apparatus of claim 1, wherein the electrostatic vibrating body has a symmetrical center line through the connecting position of the elastic body and the fixed support and along long rods of the elastic body.

* * * * *